US012743521B2

(12) United States Patent
Hulick, Jr. et al.

(10) Patent No.: US 12,743,521 B2
(45) Date of Patent: Sep. 22, 2026

(54) SYSTEMS AND METHODS FOR MERGING PERFORMANCE AND SECURITY INTO A UNIT TESTING ENVIRONMENT

(71) Applicant: Cisco Technology, Inc., San Jose, CA (US)

(72) Inventors: Walter T. Hulick, Jr., Pearland, TX (US); Ashutosh Kulshreshtha, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 17/661,616

(22) Filed: May 2, 2022

(65) Prior Publication Data

US 2023/0351022 A1 Nov. 2, 2023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .. G06F 21/577; G06F 2221/034; G06F 11/36; G06F 11/3604; G06F 11/3664; G06F 11/3668; G06F 11/3672; G06F 11/368; G06F 11/3684
See application file for complete search history.

(56) References Cited

U.S. PATENT DOCUMENTS 9,058,424 B1 * 6/2015 Bienkowski ........ G06F 11/3684
9,727,436 B2 * 8/2017 Mostafa ................ G06F 11/301
10,635,566 B1 * 4/2020 Talluri ................ G06F 11/3409
10,872,025 B1 * 12/2020 Wu ........................... G06F 8/75
11,074,163 B2 * 7/2021 Ferguson ............ G06F 11/3688
2008/0307264 A1 * 12/2008 de Halleux ......... G06F 11/3688 714/38.1
2013/0205399 A1 * 8/2013 Kalman .................. G06F 21/10 726/25
2013/0312102 A1 * 11/2013 Brake ................ H04L 63/1433 726/25

(Continued)

FOREIGN PATENT DOCUMENTS

CN 113010420 A * 6/2021 .......... G06F 11/3672
CN 114021123 A * 2/2022

OTHER PUBLICATIONS

Yishai. "Easy way of running the same junit test over and over?". StackOverflow. Nov. 11, 2010. Web. <https://web.archive.org/web/20101105162815/https://stackoverflow.com/questions/1492856/easy-way-of-running-the-same-junit-test-over-and-over> (Year: 2010).*

(Continued)

*Primary Examiner* — Jung W Kim
*Assistant Examiner* — James P Moles
(74) *Attorney, Agent, or Firm* — Baker Botts L.L.P.

(57) ABSTRACT

In one embodiment, a method includes identifying, by a device, a unit test, modifying, by the device, the unit test to include a performance test, and modifying, by the device, the unit test to include a security test. The method also includes executing, by the device, the performance test and executing, by the device, the security test. The method further includes generating, by the device, performance test results in response to executing the performance test and generating, by the device, security test results in response to executing the security test.

14 Claims, 3 Drawing Sheets

(56) References Cited

U.S. PATENT DOCUMENTS

| | | | | |
|---|---|---|---|---|
| 2014/0109228 | A1 * | 4/2014 | Kalman | G06F 21/577 726/25 |
| 2015/0220420 | A1 * | 8/2015 | Boneti | G06F 11/3419 714/37 |
| 2017/0017789 | A1 | 1/2017 | Daymont | |
| 2018/0121657 | A1 | 5/2018 | Hay et al. | |
| 2018/0129812 | A1 * | 5/2018 | Kang | G06F 21/566 |
| 2019/0205542 | A1 | 7/2019 | Kao et al. | |
| 2020/0125485 | A1 * | 4/2020 | Wiener | G06F 11/3698 |
| 2020/0202007 | A1 * | 6/2020 | Nagaraja | G06F 11/3684 |
| 2020/0210592 | A1 * | 7/2020 | Karas | G06F 21/552 |
| 2020/0285757 | A1 | 9/2020 | Bhalla et al. | |
| 2020/0364350 | A1 | 11/2020 | Wysopal et al. | |
| 2021/0133084 | A1 * | 5/2021 | Ferguson | G06N 3/08 |
| 2021/0165729 | A1 * | 6/2021 | Vijayvergia | G06F 11/3688 |
| 2021/0191845 | A1 * | 6/2021 | Bach | G06F 11/3688 |
| 2021/0382811 | A1 * | 12/2021 | Pickren | G06F 11/3688 |
| 2022/0147635 | A1 * | 5/2022 | Copty | G06F 11/3636 |
| 2022/0391309 | A1 * | 12/2022 | Douglas | G06F 11/3466 |
| 2023/0185295 | A1 * | 6/2023 | Okumura | G06F 21/575 700/81 |
| 2024/0220636 | A1 * | 7/2024 | Yi | G06F 21/57 |

OTHER PUBLICATIONS

Horký, Vojtěch et al. "Performance Regression Unit Testing: A Case Study." Computer Performance Engineering. Berlin, Heidelberg: Springer Berlin Heidelberg, 2013. 149-163. Web. (Year: 2013).*

Heejin Kim, et al. "Performance Testing of Mobile Applications at the Unit Test Level." 2009 Third IEEE International Conference on Secure Software Integration and Reliability Improvement, IEEE, 2009, pp. 171-180, https://doi.org/10.1109/SSIRI.2009.28. (Year: 2009).*

* cited by examiner

SYSTEMS AND METHODS FOR MERGING PERFORMANCE AND SECURITY INTO A UNIT TESTING ENVIRONMENT

TECHNICAL FIELD

The present disclosure relates generally to communication networks, and more specifically to systems and methods for merging performance and security into a unit testing environment.

BACKGROUND

Continuous Integration/Continuous Delivery (CI/CD) build systems are used to build and package commercial software throughout the world. These systems are generally designed around a series of steps such that each step is dependent on successful completion of the previous step. If all steps are completed, the resulting artifact (e.g., product) is posted and/or distributed for use by customers. One of these steps may include one or more unit tests. The unit test step is generally designed to detect a bug by isolating a function, generating a response, and evaluating the response for accuracy. Typically, these unit tests are mocked, which means that the unit tests are not running with a real application and the input arguments are not real data.

DESCRIPTION OF EXAMPLE EMBODIMENTS

Overview

Figure 1:
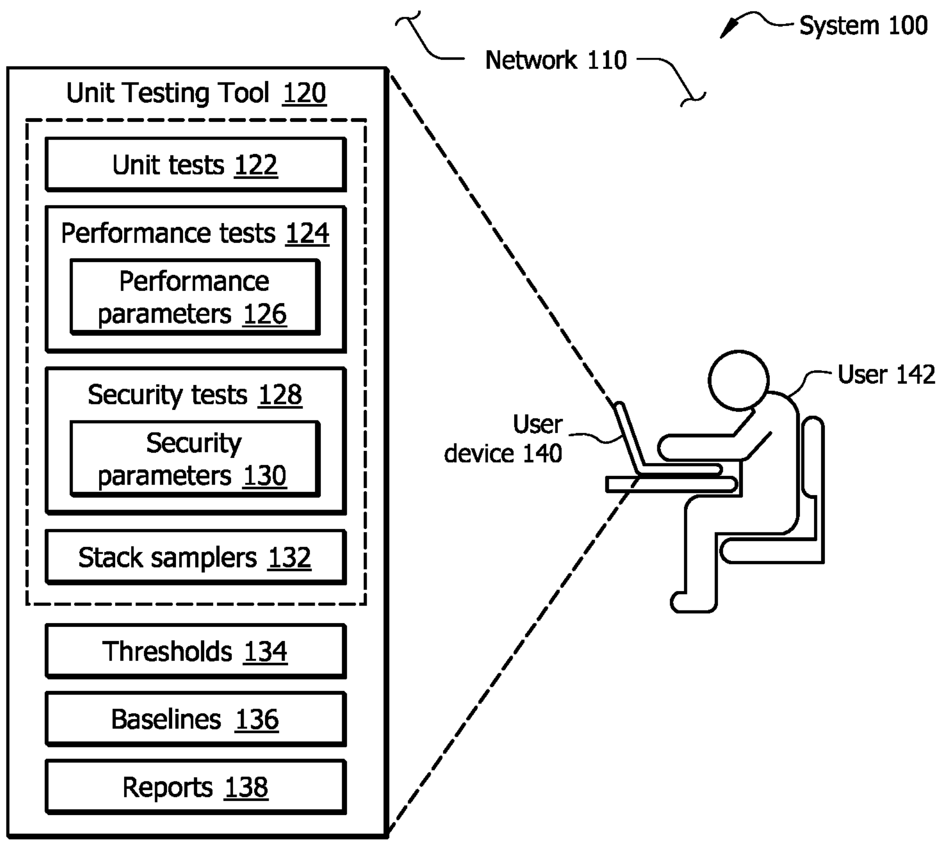
FIG. 1 illustrates an example system for merging performance and security into a unit testing environment.

According to an embodiment, a device includes one or more processors and one or more computer-readable non-transitory storage media coupled to the one or more processors and including instructions that, when executed by the one or more processors, cause the device to perform operations. The operations include identifying a unit test, modifying the unit test to include a performance test, and modifying the unit test to include a security test. The operations also include executing the performance test and executing the security test. The operations further include generating performance test results in response to executing the performance test and generating security test results in response to executing the security test.

In certain embodiments, the operations include modifying the unit test to specify a number of iterations and executing the unit test the number of iterations.

In some embodiments, the operations include modifying the unit test to comprise a stack sampler, executing the stack sampler, generating stack sampler results in response to executing the stack sampler.

In certain embodiments, executing the performance test includes determining a response time associated with the unit test, comparing the response time to a predetermined threshold, and failing the unit test if the response time exceeds the predetermined threshold.

In some embodiments, executing the security test includes determining a Common Vulnerability Scoring System (CVSS) score, comparing the CVSS score to a predetermined threshold, and failing the unit test if the CVSS score exceeds the predetermined threshold.

In certain embodiments, the operations include generating a performance baseline using the performance test results and generating a security baseline using the security test results. In some embodiments, the operations include using machine learning to modify the unit test.

According to another embodiment, a method includes identifying, by a device, a unit test, modifying, by the device, the unit test to include a performance test, and modifying, by the device, the unit test to include a security test. The method also includes executing, by the device, the performance test and executing, by the device, the security test. The method further includes generating, by the device, performance test results in response to executing the performance test and generating, by the device, security test results in response to executing the security test.

According to yet another embodiment, one or more computer-readable non-transitory storage media embody instructions that, when executed by a processor, cause the processor to perform operations. The operations include identifying a unit test, modifying the unit test to include a performance test, and modifying the unit test to include a security test. The operations also include executing the performance test and executing the security test. The operations further include generating performance test results in response to executing the performance test and generating security test results in response to executing the security test.

Technical advantages of certain embodiments of this disclosure may include one or more of the following. Certain systems and methods described herein combine functionality related to security, performance, and reliability into a CI/CD unit test step that the development community understands and that CI/CD pipelines embrace. In certain embodiments, the unit test is more realistic since it is not mocked. Certain embodiments perform a regression test that identifies regressions in performance and/or security and compares the regressions with previous history, which improves the efficiency of the system. Some embodiments perform a scan to identify the code, libraries, and/or vulnerabilities that are being used. As another advantage, certain embodiments of this disclosure may improve quality of the software products by combining security, performance, and reliability into a CI/CD unit test step rather than using multiple autonomous tools from multiple vendors that are not correlated or integrated. Certain embodiments of this disclosure will reduce the mean time to detect regressions. Certain embodiments of this disclosure move the testing earlier in the application life cycle (known as shift-left testing). For example, the testing may be performed between the development and production cycles, which may save resources and improve defect discovery and debugging.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for merging performance and security into a unit testing environment. Generally, commercial products are checked for security, performance, and reliability. In normal CI/CD pipelines, these three different steps (security, performance, and reliability) are performed by three different vendors using three different software tools. The steps are not correlated or consolidated in the same account. For example, the build steps may include: (1) a unit test (which is mocked and not real); (2) a regression test (which is generally separate from the build); and (3) a code scan (e.g., a Black Duck scan). Since no automated ability exists that compares builds to determine whether some type of performance or security regression has been introduced, the comparison would need to be performed manually. For example, a user may identify the build or test artifacts from the three different software tools used in the steps above and review them.

Certain embodiments of this disclosure use and/or modify existing unit test annotations such as JUnit. JUnit is the unit testing framework for the Java programming language. JUnit uses an "@Test" annotation to mark the methods to compile and test. Although JUnit provides the ability to repeat a test, it does not provide for any parameters around and it. While certain versions of JUnit provide for execution timeout, JUnit does not provide for any comparisons with baselines or create a history of what the timings were. In certain embodiments, a user of JUnit may use JUnit as is, which involves executing the unit test, storing the execution time, applying any stack sampling, reviewing the libraries involved, and storing the results in a baseline. In certain embodiments of this disclosure, a user of Junit may modify the test annotation by customizing the test situation to specify how many times the test will run and to include parameters around the test failing or succeeding.

FIG. 1 illustrates an example system 100 for merging performance and security into a unit testing environment. System 100 or portions thereof may be associated with an entity, which may include any entity, such as a business, company, or enterprise, that uses unit testing. The components of system 100 may include any suitable combination of hardware, firmware, and software. For example, the components of system 100 may use one or more elements of the computer system of FIG. 3. In the illustrated embodiment of FIG. 1, system 100 includes a network 110, a unit testing tool 120, unit tests 122, performance tests 124, performance parameters 126, security tests 128, security parameters 130, stack samplers 132, thresholds 134, baselines 136, reports 138, a user device 140, and a user 142.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network. Nodes may include virtual and/or physical nodes. Nodes may include one or more virtual machines, hardware devices, bare metal servers, and the like. As another example, nodes may include data communications equipment such as computers, routers, servers, printers, workstations, switches, bridges, modems, hubs, and the like. In certain embodiments, nodes use static and/or dynamic routing to send data to and/or receive data to other nodes of system 100. In the illustrated embodiment of FIG. 1, nodes include user device 140.

Unit testing tool 120 of system 100 is a software program installed on device 140 that tests individual units of source code to determine whether they are fit for use in a software application. An application is computer software that performs a specific function. Applications may include web browsers, multimedia software, content access software, enterprise software, database software, and the like. Applications may use computer programming languages, runtime libraries, and/or administration code, etc. In certain embodiments, unit testing tool 120 merges performance and/or security into a unit testing environment. For example, unit testing tool 120 may merge one or more performance tests 124 and/or one or more security tests 128 into one or more unit tests 122.

Unit tests 122 are software tests that are used to determine if a section of an application (known as a unit) is behaving in accordance with its intended use. In certain embodiments, criteria are coded into each unit test 122 to verify its correctness. Unit test frameworks may log unit tests 122 that fail any criterion and identify failed criterion and associated unit tests 122 in reports 138. Unit tests 122 may use any suitable programming language. For example, unit tests 122 may use Java, JavaScript, Python, Kotlin, R, Go, Ruby, PHP, C, C#, C++, Swift, SQL, Visual Basic .Net, HTML/CSS, TypeScript, and the like.

In certain embodiments, unit tests 122 use one or more unit testing frameworks that are compatible with a particular programming language. For example, Java unit tests 122 may use Java testing frameworks such as JUnit, JBehave, Serenity, TestNG, Selenide, Gauge, Geb, Spock, HttpUnit, JWebUnit, etc. As another example, Python unit tests 122 may use Python testing frameworks such as PyTest, Testify, Unittest, Robot, Nose2, DocTest, etc.

Performance tests 124 of system 100 are checks that are incorporated into unit tests 122 to test the performance of applications. Performance tests 124 check applications against particular performance parameters 126. Performance parameters 126 may include response time metrics (average response time (ART) spent processing unit test 122); wait time metrics (average time spent when invocations are in a thread sleep or wait state), block time/average block time metrics (average wait time to get a lock); central processing unit (CPU) usage metrics (the amount of time the virtual machine used the CPU to process unit test 122); memory usage metrics (the resources used to process the request in terms of physical memory on device 140), error detection metrics (unhandled exceptions and any exception that prevents unit test 122 from completing successfully are counted as errors); slow transactions metrics (number of instances that meet the predetermined criteria for a slow transaction); stalled transactions metrics (number of instances that meet the predetermined criteria defined for a stalled transaction (e.g., takes more than 45 seconds to finish)); HTTP error code metrics (includes all HTTP calls done outside of a web service call that produced an error); average request size metrics (HTTP request content length for each unit test 122); and the like. In certain embodiments, performance tests 124 are regression tests used to determine whether a performance regression was introduced into the application.

Security tests 128 of system 100 are checks that are incorporated into unit tests 122 to test the security of applications. For example, security tests 128 may identify security weaknesses in the source code of applications. Security tests 128 check applications against particular security parameters 130. Security parameters 130 may include vulnerabilities such as common vulnerabilities and exposures listed in the Common Vulnerabilities and Exposures (CVE) glossary, vulnerabilities that are associated with a particular score in the Common Vulnerability Scoring System (CVSS), JavaScript/Node.js-specific vulnerabilities identified by the Node Security Project, Ruby-specific vulnerabilities identified by RubySec, vulnerabilities identified by the National Vulnerability Database (NVD), and the like. In certain embodiments, security tests 128 are regression tests that are used to determine whether a security regression was introduced into the application.

In certain embodiments, new annotation enhancements are used to merge performance tests 124, security tests 128, and the like into unit tests 122. For example, unit test annotations in existing unit testing frameworks such as JUnit may be modified to include performance tests 124 and/or security tests 128. JUnit is a unit testing framework for the Java programming language that uses an "@Test" annotation within unit tests 122 to mark the methods to compile and test.

The existing unit test annotation (e.g., @Test) may modified to customize the test situation. For example, the existing unit test annotation may be customized to specify the number of iterations (e.g., how many times unit test 122 will run). As another example, the existing unit test annotation may be customized to include parameters around unit test 122 failing or succeeding. As still another example, the existing unit test annotation may be customized to add results (e.g., performance or security results) to one or more baselines 136 (e.g., performance or security baseline 136).

In certain embodiments, unit testing tool 120 incorporates one or more stack samplers 132 into one or more unit tests 122. Stack samplers 132 collect stack samples. Stack samples include information about the active subroutines of unit testing tool 120. For example, stack samples my indicate where CPU time was spent. In certain embodiments, stack samplers 132 run in unit tests 122 while unit tests 122 are running. In certain embodiments, unit testing tool 120 compares stack samples to detect changes. For example, a stack sample comparison may indicate the particular source code that caused a change in performance and/or security.

In certain embodiments, performance tests 124 and/or security tests 128 are associated with one or more thresholds 134. Thresholds 134 are boundaries of acceptable or normal behavior from a performance and/or security viewpoint. In some embodiments, thresholds 134 are used to define acceptable high and low values for performance parameters 126 and/or security parameters 130. In certain embodiments, unit testing tool 120 may use thresholds 134 to identify anomalies in unit tests 122. For example, unit testing tool 120 may identify an anomaly in performance parameter 126 if performance parameter 126 exceeds predetermined threshold 134. As another example, unit testing tool 120 may detect an anomaly in security parameter 130 if security parameter 130 if exceeds predetermined threshold 134.

Performance tests 124 that may be added to unit tests 122 include comparing a one or more performance parameters 126 (e.g., a response time or an average response time spent processing unit test 122) to one or more thresholds 134 (e.g., a maximum response time). For example, if performance parameter 126 is greater than average threshold 134, then unit testing tool 120 may fail performance test 124. As another example, if performance parameter 126 is greater than threshold 134 (i.e., one or more instances exceed the threshold), then unit testing tool 120 may fail performance test 124. As still another example, if performance parameter 126 is greater than a standard deviation (i.e., the standard deviation exceeds a performance baseline), then unit testing tool 120 may fail performance test 124. In certain embodiments, performance tests 124 may include adding performance parameters 126 to one or more performance baselines 136.

Security tests 128 that may be added to unit test 122 include comparing a one or more security parameters 130 (e.g., a CVSS score) to one or more thresholds 134 (e.g., a maximum CVSS score). For example, if security parameter 130 (e.g., an average CVSS score) is greater than average threshold 134 (e.g., an average maximum CVSS score), then unit testing tool 120 may fail security test 128. As another example, if security parameter 130 (e.g., a CVE) is greater than threshold 134 (e.g., one or more CVEs are older than a predetermined number of days), then unit testing tool 120 may fail security test 128. As still another example, if security parameter 130 is greater than a standard deviation (i.e., the standard deviation exceeds a performance baseline by a predetermined value or percentage), then unit testing tool 120 may fail security test 128). In certain embodiments, security tests 128 may include adding security parameters 130 to one or more security baselines 136.

In certain embodiments, unit testing tool 120 may compare one or more performance parameters 126, performance results, security parameters 130, and/or security results to one or more baselines 136. Baselines 136 of system 100 are used to benchmark normal behavior for applications of system 100. In certain embodiments, unit testing tool 120 generates and/or builds baselines 136 in response to executing performance tests 124 and/or security tests 128. In certain embodiments, unit testing tool 120 automatically calculates dynamic baselines 136 using machine learning. Through baselines 136, unit testing tool 120 may define what is normal for results of performance tests 124 and/or security tests 128. In certain embodiments, unit testing tool 120 may use baselines 136 to identify performance results and/or security results having values that fall out of this normal range.

In certain embodiments, unit testing tool 120 associates thresholds 134 with baselines 136. For example, high and low thresholds 134 for a particular performance parameter 126, performance result, security parameter 130, and/or security result may be established using high and low values from associated baseline 136. In some embodiments, unit testing tool 120 builds baseline 136 for each unit test 122.

In certain embodiments, unit testing tool 120 compares baselines 136 from different builds and/or versions of an application, which may indicate one or more regressions (e.g., a performance regression and/or a security regression). Unit testing tool 120 may compare baselines 136 generated for the same unit test 122 over different periods of time to determine any changes between baselines 136. For example, unit testing tool 120 may compare first baseline 136 generated for unit test 122 on a particular day to second baseline 136 generated for unit test 122 on the day following that particular day. If the standard deviation of second baseline 136 is greater than a predetermined value from first baseline 136, unit testing tool 120 may fail unit test 122.

In certain embodiments, unit testing tool 120 uses the performance results and/or the security results to determine whether to publish an artifact. For example, in response to executing performance test 124, unit testing tool 120 may determine that the response time of an application is greater than a maximum predetermined response time and determine not to publish the application as a result. As another example, in response to executing security test 128, unit testing tool 120 may determine that the CVSS score of an application is greater than a predetermined maximum CVSS score and determine not to publish the application as a result. As still another example, in response to executing performance test 124 and security test 128, unit testing tool 120 may determine that the response time of an application is greater than a predetermined maximum response time and that the CVSS score of the application is greater than a predetermined maximum CVSS score and determine not to publish the application as a result.

In certain embodiments, unit testing tool 120 generates reports 138 associated with unit tests 122. Reports 138 are notifications based on configured conditions. Reports 138 allows users 142 to visualize any issues (e.g., performance and/or security issues) associated with unit test 122. In certain embodiments, reports 138 provide an overall view of one or more applications that allows users 142 to quickly determine if any part of a tested application is experiencing a failure. Reports 138 may display one or more graphs, charts, tables, lists, or any other suitable format to represent the issues of one or more applications of system 100. In certain embodiments, reports 138 provide visual representations of one or more thresholds 134 and/or one or more baselines 136 to user 142. In certain embodiments, unit testing tool 120 generates conditions that use thresholds 134, baselines 136, and/or anomalies to trigger reports 138.

User device 140 of system 100 includes any user equipment that can receive, create, process, store, and/or communicate information. User device 140 may include one or more workstations, desktop computers, laptop computers, mobile phones (e.g., smartphones), tablets, personal digital assistants (PDAs), wearable devices, and the like. In certain embodiments, user device 140 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 140 may be located in any suitable location to receive and communicate information to user 142 of system 100.

User 142 of system 100 is a person or group of persons who utilizes user device 140 of system 100. In certain embodiments, user 142 is a software developer, an independent software tester, and the like. User 142 may be associated with one or more accounts. User 142 may be a local user, a remote user, an administrator, a customer, a company, a combination thereof, and the like. User 142 may be associated with a username, a password, a user profile, etc.

In operation, as part of a CI/CD step between development and production, unit testing tool 120 modifies unit test annotations (e.g., an "@Test" attribute) for unit tests 120 to include performance tests 124 and security tests 128. Unit testing tool 120 iterates through all classes in a test folder and identifies the classes marked with the unit test annotation. Unit testing tool 120 performs unit tests 122 according to the modified annotations. Unit testing tool 120 accesses performance and security thresholds 134 and/or baselines 136 and activates stack samplers 132 for unit tests 120 that request stack samplers 132. Unit testing tool 120 compares the results from performance tests 124 and security tests 128 with performance and security thresholds 134 and/or baselines 136 to determine whether to pass or fail unit test 122. Unit testing tool 120 generates report 138 for the CI/CD step. As such, system 100 combines security, performance, and reliability into a CI/CD unit test step rather than using multiple autonomous tools from multiple vendors that are not correlated or integrated.

Although FIG. 1 illustrates a particular number of networks 110, unit testing tools 120, unit tests 122, performance tests 124, performance parameters 126, security tests 128, security parameters 130, stack samplers 132, thresholds 134, baselines 136, reports 138, user devices 140, and users 142, this disclosure contemplates any suitable number of networks 110, unit testing tools 120, unit tests 122, performance tests 124, performance parameters 126, security tests 128, security parameters 130, stack samplers 132, thresholds 134, baselines 136, reports 138, user devices 140, and users 142.

Although FIG. 1 illustrates a particular arrangement of network 110, unit testing tool 120, unit tests 122, performance tests 124, performance parameters 126, security tests 128, security parameters 130, stack samplers 132, thresholds 134, baselines 136, reports 138, user device 140, and user 142, this disclosure contemplates any suitable arrangement of network 110, unit testing tool 120, unit tests 122, performance tests 124, performance parameters 126, security tests 128, security parameters 130, stack samplers 132, thresholds 134, baselines 136, reports 138, user device 140, and user 142.

Furthermore, although FIG. 1 describes and illustrates particular components, devices, or systems carrying out particular actions, this disclosure contemplates any suitable combination of any suitable components, devices, or systems carrying out any suitable actions.

Figure 2:
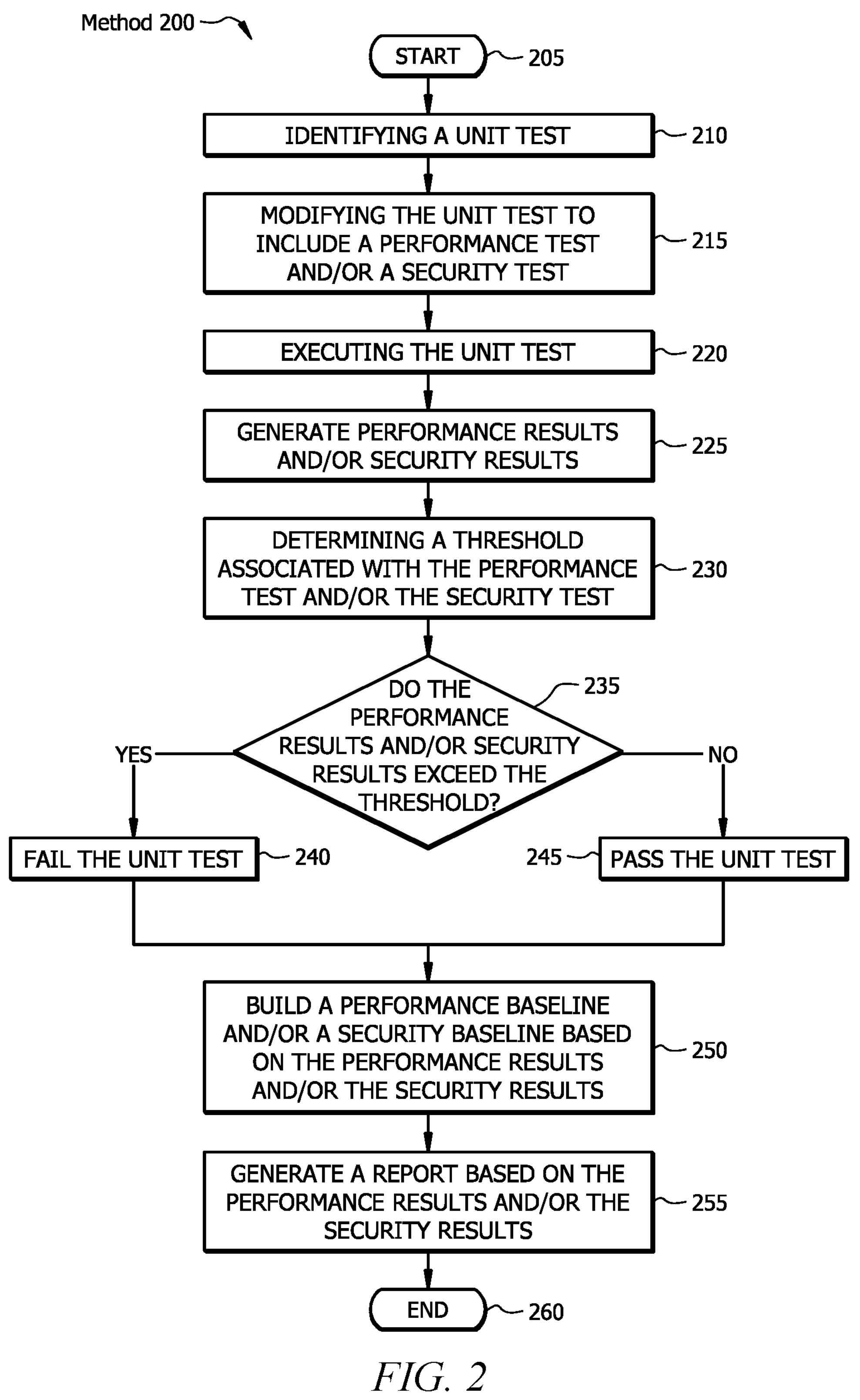
FIG. 2 illustrates an example method for merging performance and security into a unit testing environment.

FIG. 2 illustrates an example method 200 for merging performance and security into a unit testing environment. Method 200 begins at step 205. At step 210 of method 200, a unit testing tool identifies a unit test. For example, referring to FIG. 1, unit testing tool 120 of system 100 may identify unit test 122 by identifying a test annotation (e.g., @Test). In certain embodiments, the unit test is part of a CI/CD pipeline. Method 200 then moves from step 210 to step 215.

At step 215 of method 200, the unit testing tool modifies the unit test to include a performance test and/or a security test. For example, referring to FIG. 1, unit testing tool 120 may modify the existing unit test annotation of unit test 122 to determine performance measurements such as network latency, transaction throughput, etc. As another example, unit testing tool 120 may modify the existing unit test annotation of unit test 122 to check an application for vulnerabilities (e.g., CVEs), the ages of the vulnerabilities, etc. In certain embodiments, the unit testing tool may modify the unit test to instruct the unit test to run a predetermined number of times (e.g., 10 times, 100 times, 1000 times, etc.). For example, referring to FIG. 1, unit testing tool 120 may modify an existing unit test annotation of unit test 122 to specify the number of iterations by including an argument such as "Iterate=x" (where x represents any suitable integer). Method 200 then moves from step 215 to step 220.

At step 220 of method 200, the unit testing tool executes the unit test. For example, referring to FIG. 1, unit testing tool 120 may execute unit test 122, which has been modified to run the test 100 times, to determine performance measurements such as network latency, and to check the application for CVEs. Method 200 then moves from step 220 to step 225, where the unit testing tool generates performance results and/or security results. For example, referring to FIG. 1, unit testing tool 120 may automatically generate an average network latency in response to running performance test 124 within unit test 122 a predetermined number of times. As another example, referring to FIG. 1, unit testing tool 120 may automatically determine a CVSS score based on the identified CVEs within an application in response to running security test 128 within unit test 122. Method 200 then moves from step 225 to step 230.

At step 230 of method 200, the unit testing tool determines a threshold associated with the performance test and/or the security test. For example, referring to FIG. 1, unit testing tool 120 may determine performance thresholds 134 (e.g., an acceptable threshold for latency) and security thresholds 134 (e.g., an acceptable CVSS score). In certain embodiments, the unit test is modified to include the thresholds. For example, referring to FIG. 1, unit test 122 may be modified to include a latency threshold or an average latency threshold of a predetermined number of milliseconds (e.g., 25 milliseconds) by including an argument such as "maximum latency=x" or "maximum average latency=x" (where x represents any suitable integer). Method 200 then moves from step 230 to step 235.

At step 235 of method 200, the unit testing tool determines whether the performance results and/or security results exceed the predetermined thresholds. For example, referring to FIG. 1, unit testing tool 120 may determine whether the performance results (e.g., the network latency) exceed predetermined performance thresholds 134 (e.g., a maximum latency). As another example, referring to FIG. 1, unit testing tool 120 may determine whether the security results (e.g., a CVSS score) exceed predetermined security thresholds 134 (e.g., a maximum allowable CVSS score). In certain embodiments, the unit test is modified to include the comparisons. For example, referring to FIG. 1, unit test 122 may be modified to include an argument such as "compare threshold=true" or "compare baseline=true" (where true represents executing the comparison).

If, at step 235, the unit testing tool determines that the performance and/or security results do not exceed the threshold, method 200 advances from step 235 to step 245, where the unit testing tool passes the unit test. For example, referring to FIG. 1, if unit testing tool 120 determines from the comparison that the average network latency after "x" number of iterations is less than or equal to the maximum average latency threshold, then unit testing tool 120 may pass unit test 122. As another example, referring to FIG. 1, if unit testing tool 120 determines from the comparison that the average CVSS score after "x" number of iterations is less than or equal to the maximum average CVSS score threshold, then unit testing tool 120 may pass unit test 122.

If, at step 235, the unit testing tool determines that the performance and/or security results exceed the threshold, method 200 moves from step 235 to step 240, where the unit testing tool fails the unit test. For example, referring to FIG. 1, if unit testing tool 120 determines from the comparison that the average network latency after "x" number of iterations exceeds the maximum average latency threshold, then unit testing tool 120 may fail unit test 122. As another example, referring to FIG. 1, if unit testing tool 120 determines from the comparison that the average CVSS score after "x" number of iterations exceeds the maximum average CVSS score threshold, then unit testing tool 120 may fail unit test 122. Method 200 then moves from step 240 and step 245 to step 250.

At step 250 of method 200, the unit testing tool builds a performance baseline and/or a security baseline based on the performance results and/or the security results. For example, referring to FIG. 1, unit testing tool 120 may build performance baseline 136 based on the performance results (e.g., average network latency) from running performance test 124 through "x" iterations. As another example, referring to FIG. 1, unit testing tool 120 may build security baseline 136 based on security results (e.g., average CVSS score) from running security test 124 through "x" iterations. Method 200 then moves from step 250 to step 255.

At step 255 of method 200, the unit testing tool generates a report based on the performance results and/or the security results. For example, referring to FIG. 1, the unit testing tool may generate report 138 that includes an identity of one or more unit tests 122, an indication of pass/fail for one or more performance tests 124, an indication of pass/fail for one or more security tests 128, one or more performance/security thresholds 134, one or more performance/security baselines 136, etc. Method 200 then moves from step 255 to step 260, where method 200 ends. As such, method 200 combines security, performance, and reliability into a CI/CD unit test step rather than using multiple autonomous tools from multiple vendors that are not correlated or integrated.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method 200 for merging performance and security into a unit testing environment including the particular steps of the method of FIG. 2, this disclosure contemplates any suitable method for merging performance and security into a unit testing environment, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
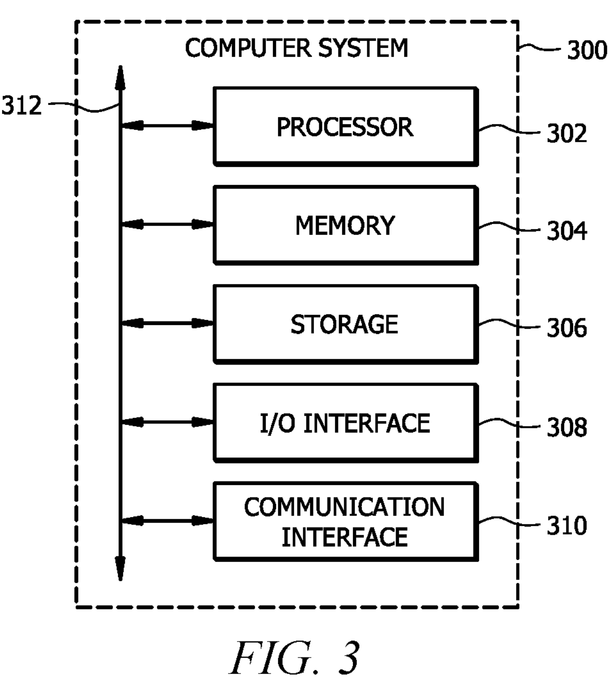
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A device, comprising:

one or more processors; and one or more computer-readable non-transitory storage media coupled to the one or more processors and comprising instructions that, when executed by the one or more processors, cause the device to perform operations comprising:

identifying a unit test associated with an artifact;

modifying the unit test to include a first argument that instructs the unit test to run a predetermined number of times;

executing the unit test the predetermined number of times;

generating performance test results in response to executing the unit test, wherein the performance test results include a performance measurement for network latency;

determining a performance threshold that represents an acceptable threshold for latency using the performance measurement for the network latency;

modifying the unit test to include the performance threshold;

executing the modified unit test to generate modified performance test results as part of a Continuous Integration/Continuous Delivery (CI/CD) step between development and production of the artifact; and determining whether to publish the artifact based at least in part on the modified performance test results.

2. The device of claim 1, the operations further comprising:

modifying the unit test to comprise a stack sampler;

executing the stack sampler; and generating stack sampler results in response to executing the stack sampler.

3. The device of claim 1, wherein executing the performance test comprises:

determining a response time associated with the unit test;

comparing the response time to a predetermined threshold; and failing the unit test if the response time exceeds the predetermined threshold.

4. The device of claim 1, wherein:

modifying the unit test further comprises including a security test in the unit test; and executing the unit test further comprises:

comparing a Common Vulnerability Scoring System (CVSS) score to a predetermined threshold; and failing the unit test if the CVSS score exceeds the predetermined threshold.

5. The device of claim 1, the operations further comprising using machine learning to modify the unit test.

6. A method, comprising:

identifying, by a device, a unit test associated with an artifact;

modifying, by the device, the unit test to include a first argument that instructs the unit test to run a predetermined number of times;

executing, by the device, the unit test the predetermined number of times;

generating, by the device, performance test results in response to executing the unit test, wherein the performance test results include a performance measurement for network latency;

determining, by the device, a performance threshold that represents an acceptable threshold for latency using the performance measurement for the network latency;

modifying, by the device, the unit test to include the performance threshold;

executing, by the device, the modified unit test to generate modified performance test results as part of a Continuous Integration/Continuous Delivery (CI/CD) step between development and production of the artifact; and determining, by the device, whether to publish the artifact based at least in part on the modified performance test results.

7. The method of claim 6, further comprising:

modifying, by the device, the unit test to comprise a stack sampler;

executing, by the device, the stack sampler; and generating, by the device, stack sampler results in response to executing the stack sampler.

8. The method of claim 6, wherein executing the performance test comprises:

determining, by the device, a response time associated with the unit test;

comparing, by the device, the response time to a predetermined threshold; and failing, by the device, the unit test if the response time exceeds the predetermined threshold.

9. The method of claim 6, wherein:

modifying the unit test further comprises including a security test in the unit test; and executing the unit test further comprises:

comparing a Common Vulnerability Scoring System (CVSS) score to a predetermined threshold; and failing the unit test if the CVSS score exceeds the predetermined threshold.

10. The method of claim 6, further comprising using, by the device, machine learning to modify the unit test.

11. One or more computer-readable non-transitory storage media embodying instructions that, when executed by a processor, cause the processor to perform operations comprising:

identifying a unit test associated with an artifact;

modifying the unit test to include a first argument that instructs the unit test to run a predetermined number of times;

executing the unit test the predetermined number of times;

generating performance test results in response to executing the unit test, wherein the performance test results include a performance measurement for network latency;

determining a performance threshold that represents an acceptable threshold for latency using the performance measurement for the network latency;

modifying the unit test to include the performance threshold;

executing the modified unit test to generate modified performance test results as part of a Continuous Integration/Continuous Delivery (CI/CD) step between development and production of the artifact; and determining whether to publish the artifact based at least in part on the modified performance test results.

12. The one or more computer-readable non-transitory storage media of claim 11, the operations further comprising:

modifying the unit test to comprise a stack sampler;

executing the stack sampler; and generating stack sampler results in response to executing the stack sampler.

13. The one or more computer-readable non-transitory storage media of claim 11, wherein executing the performance test comprises:

determining a response time associated with the unit test;

comparing the response time to a predetermined threshold; and failing the unit test if the response time exceeds the predetermined threshold.

14. The one or more computer-readable non-transitory storage media of claim 11, wherein:

modifying the unit test further comprises including a security test in the unit test; and executing the unit test further comprises:

comparing a Common Vulnerability Scoring System (CVSS) score to a predetermined threshold; and failing the unit test if the CVSS score exceeds the predetermined threshold.

* * * * *